United States Patent
Stukenholtz et al.

(10) Patent No.: US 11,751,509 B2
(45) Date of Patent: Sep. 12, 2023

(54) AGRICULTURAL CHAFF COLLECTOR

(71) Applicants: Ty E. Stukenholtz, Auburn, NE (US); Jay E. Stukenholtz, Nebraska City, NE (US)

(72) Inventors: Ty E. Stukenholtz, Auburn, NE (US); Jay E. Stukenholtz, Nebraska City, NE (US)

(73) Assignee: FARMMAX, LLC, Auburn, NE (US)

( * ) Notice: Subject to any disclaimer, the term of this patent is extended or adjusted under 35 U.S.C. 154(b) by 374 days.

(21) Appl. No.: 16/924,837

(22) Filed: Jul. 9, 2020

(65) Prior Publication Data

US 2022/0007586 A1 Jan. 13, 2022

(51) Int. Cl.
| | |
|---|---|
| *A01F 12/44* | (2006.01) |
| *A01D 90/02* | (2006.01) |
| *A01D 45/00* | (2018.01) |
| *A01F 12/48* | (2006.01) |

(52) U.S. Cl.
CPC .......... *A01F 12/444* (2013.01); *A01D 45/00* (2013.01); *A01D 90/02* (2013.01); *A01F 12/48* (2013.01)

(58) Field of Classification Search
CPC ....... A01F 12/444; A01F 12/48; A01D 45/00; A01D 90/02
See application file for complete search history.

(56) References Cited

U.S. PATENT DOCUMENTS

| | | | | | |
|---|---|---|---|---|---|
| 4,188,160 | A | * | 2/1980 | Corbett | A01F 12/00 406/102 |
| 4,924,662 | A | * | 5/1990 | Quick | A01D 45/10 56/122 |
| 4,943,260 | A | * | 7/1990 | Fossum | A01F 12/00 209/241 |
| 7,651,391 | B2 | * | 1/2010 | Weichholdt | A01D 41/1243 460/115 |
| 8,616,945 | B2 | * | 12/2013 | Ritter | A01F 29/12 460/44 |
| 8,801,513 | B2 | * | 8/2014 | Ricketts | A01D 90/02 460/111 |
| 9,609,807 | B2 | * | 4/2017 | Look | A01F 29/12 |
| 2008/0248843 | A1 | * | 10/2008 | Birrell | A01B 79/005 460/59 |
| 2008/0261668 | A1 | * | 10/2008 | Stukenholtz | A01F 11/06 460/44 |
| 2008/0261671 | A1 | * | 10/2008 | Stukenholtz | A01D 43/0635 460/114 |
| 2009/0113867 | A1 | * | 5/2009 | Birrell | A01F 12/444 56/13.3 |
| 2010/0311481 | A1 | * | 12/2010 | Ritter | A01D 41/1243 460/112 |

(Continued)

FOREIGN PATENT DOCUMENTS

EP 2241174 A2 * 10/2010 ......... A01D 41/1252

*Primary Examiner* — Arpad F Kovacs
(74) *Attorney, Agent, or Firm* — Brett J. Trout

(57) ABSTRACT

A combine and combine conversion for collecting agricultural plants in a manner that separates various parts of the plants for collection or disposal. A combine is provided with an improved system for collecting and cleaning seed of an agricultural material such as cannabis while collecting lightweight chaff, such as trichomes, and returning stalks back to the agricultural field. The system provides for rapid conversion of a combine to seed and chaff collection and back again.

13 Claims, 17 Drawing Sheets

(56) References Cited

U.S. PATENT DOCUMENTS

| | | | |
|---|---|---|---|
| 2011/0034222 A1* | 2/2011 | Ricketts | A01D 45/028 460/42 |
| 2012/0108302 A1* | 5/2012 | Stukenholtz | A01F 12/44 460/79 |
| 2012/0245802 A1* | 9/2012 | Schlesser | A01D 41/1243 460/59 |

* cited by examiner

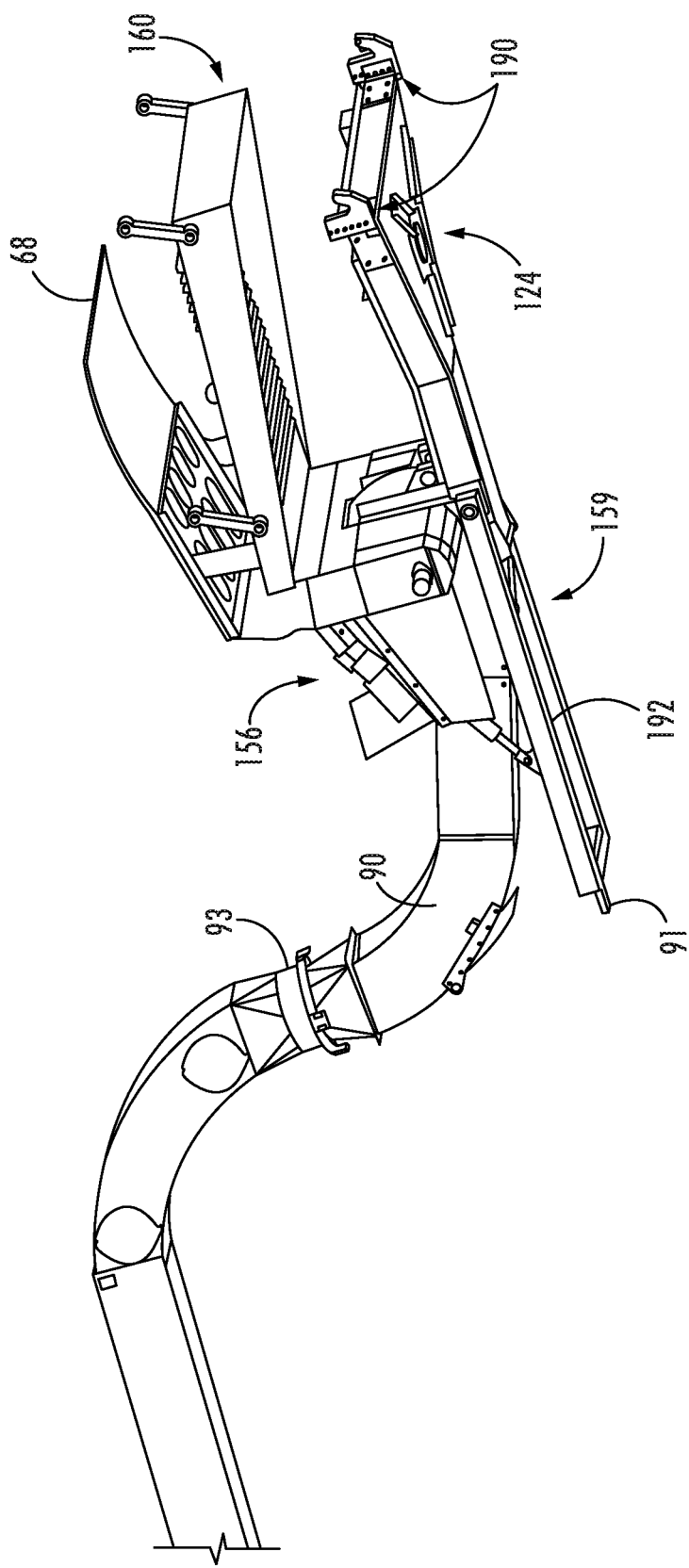

AGRICULTURAL CHAFF COLLECTOR

TECHNICAL FIELD

The present invention relates in general to a system and method for harvesting agricultural material and, more particularly, to a system and method for separating stalks and chaff from an agricultural material and collecting the chaff from an agricultural field.

BACKGROUND

The present invention relates to an improvement on the systems and methods described in U.S. Pat. Nos. 8,251,788 and 7,524,242 to Stukenholtz that are incorporated herein by this reference. Agricultural combines are capable of both harvesting and threshing agricultural material in a single vehicle. Different front ends, or headers, may be attached to the combine to harvest and thresh various types of agricultural material, such as corn, wheat, soybeans, chaff, stover, switch grass, grass, wildflowers, flowers, as well as other types of grain, seeds and organic matter. One known type of header is a grain header which, when attached to a combine, cuts the plant and conveys the plant to the combine for cleaning and separating.

Prior art rotary combines strip grain from the stalk as the plant passes along a helical rotor. Once the grain has been separated, the stripped stalks and other chaff are ejected back into the agricultural field. The separated grain is then conveyed to a storage container, either on the combine or in another vehicle. While the prior art has taught methods for retaining grain and discarding the chaff along with the stalks, for some agricultural materials it would be desirable to collect the chaff as well as the grain. For example, it would be desirable for some material to retain dust and small seed that would be blown out of the machine using prior art collection methods. Similarly, chaff collection may be desirable for crops such as soybean, wheat, wildflowers, native grasses, and other crops.

It is known in the art that the cannabis plant contains not only buds, but also valuable seeds, both of which must be separated from the stalk. It would therefore be desirable to provide a method an apparatus for separating the buds and seeds from the stalk of a cannabis plant and to collect the buds and seeds, while returning the biodegradable stalks to the agricultural field to add nutrients back to the field, preventing erosion, or baling the stalks for later use.

When harvesting cannabis, it is desirable to collect the valuable trichomes of the plant that produce the cannabidiols (CBDs), terpenes, and flavonoids that dictate the unique potency and effectiveness of a particular strain of cannabis. One drawback to prior art collection methods is that the trichomes are so light that they can be inadvertently blown out of the combine and lost during harvest. Reducing the airflow to reduce loss of trichomes can result in insufficient cleaning of the cannabis seeds. It would therefore be desirable to maximize collection of trichomes while maintaining sufficient cleaning of the cannabis seeds.

Another drawback of prior art combines is that they have a tendency to clog when handling heavy and/or wet material. Unlike many agricultural products, cannabis is often harvested at high moisture and high oil content. While harvesting cannabis at a high moisture content maximizes cannabidiol collection, moist cannabis material tends to clog prior art combines. It would therefore be desirable to modify a combine to be able to harvest and collect cannabis buds and seeds without clogging the combine.

Combines can cost hundreds of thousands of dollars. One advantage of combines is that they may be quickly modified to collect and process various types of agricultural material. Typically, combines are modified by switching headers. It would be desirable to be able to modify prior art combines to separate and collect and cannabis buds and seeds from cannabis stalks, while being able to quickly modify the combine back to process other types of agricultural material. The difficulties encountered in the prior art discussed hereinabove are substantially eliminated by the present invention.

SUMMARY OF THE DISCLOSED SUBJECT MATTER

Systems and methods of the present disclosure are directed to a combine and combine conversion for collecting agricultural plants in a manner that separates various parts of the plants for collection or disposal. A combine is provided with an improved system for collecting and cleaning seeds of an agricultural material such as cannabis while collecting lightweight chaff, such as trichomes, and returning stalks back to the agricultural field. The system provides for rapid conversion of a combine to seed and chaff collection and back again.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 17 illustrates a bottom perspective view of the processing assembly of FIG. 15.

DESCRIPTION OF EMBODIMENTS

Figure 1:
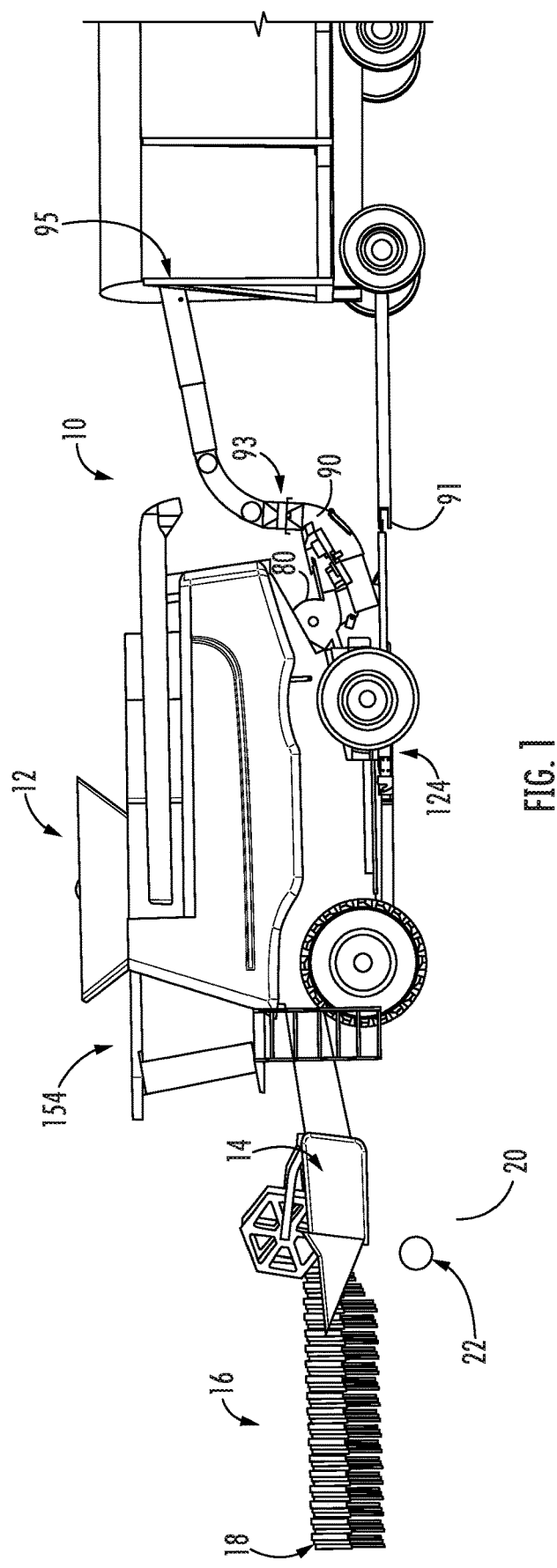
FIG. 1 illustrates a side elevation of an agricultural material separator according to one embodiment of the present invention shown with a chopper in the chopping position and spreaders located rearward of the chopper.

In general, systems and methods of this disclosure may enable a user to separate seed and chaff of an agricultural product from a stalk, and collect the seed and chaff while cleaning the seed and reducing loss of chaff. More specifically, these systems and methods allow a user to quickly and inexpensively convert a standard agricultural combine to separate seeds and buds of cannabis plants and collect them. This system and apparatus are capable of cleaning the seeds without significant loss of trichomes from the collected chaff. These systems and methods are capable of collecting high moisture plants without significant clogging of the agricultural combine.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods and systems have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first blower could be termed a second blower, and, similarly, a second blower could be termed a first blower, without departing from the scope of the present invention. The first blower and the second blower are both blowers, but they are not the same blower.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

In the following description, certain well-known components, such as wheels, drive trains, motors, electronic, pneumatic, and hydraulic controls, and so on, are not necessarily explicitly called out in the figures. It should be noted that those skilled in the art with the teachings of the present disclosure before them will understand which components to implement and how to implement them to address the needs of a given implementation.

Attention is now directed toward embodiments of the system and method for separating stalks and chaff from an agricultural material and collecting the chaff from an agricultural field.

Agricultural combines collect agricultural material from an agricultural field, separate the grain from the stover, transport the grain for storage, and return the stover to the agricultural field. Rotary combines collect agricultural material and strip grain from the stalk as the material passes along a helical rotor. Once the grain has been separated a discharge beater gathers the stripped stems and stalks from the rotor and hurls the material through an open area either onto the ground or into a spreader or chopper. A blower cleans the grain by directing airflow upward across the grain, separating chaff from the grain and blowing the chaff upward into contact with the stems and stalks and through the open area either onto the ground or into a spreader or chopper.

Figure 2:
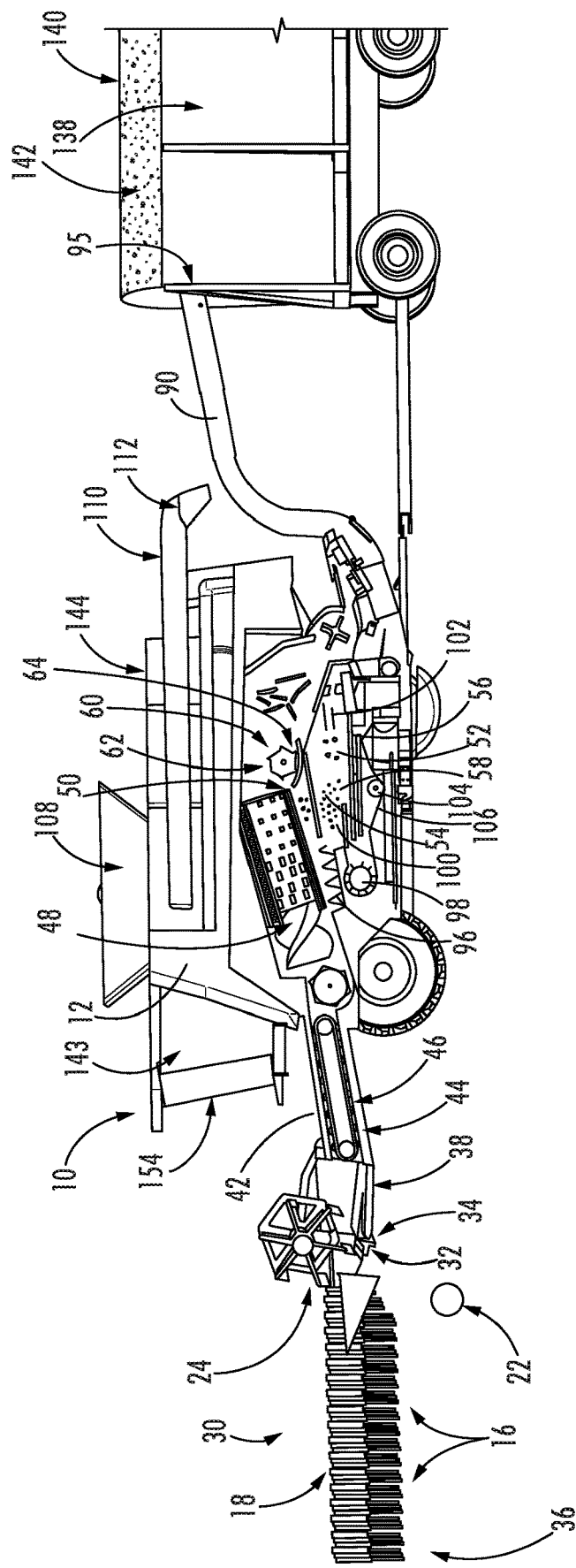
FIG. 2 illustrates a side elevation in partial cutaway of the agricultural material separator of FIG. 1.

According to one embodiment, an agricultural material separator, such as an agricultural material cleaning system, is shown generally as (10) in FIG. 1. The cleaning system (10) has an agricultural vehicle, such as rotary combine (12), which, in a preferred embodiment is a John Deere S series rotary combine, provided with an agricultural material collector, such as a grain header (14). FIGS. 1-2. The header (14) may, of course, be a platform header, draper head, stripper header, windrow header or pick-up type header as desired.

The header (14), such as those known in the art, is preferably adjusted for harvesting of cannabis plants (16), but may be adjusted to collect soybean, wheat, wildflowers, native grasses, or any other desired agricultural material. As shown in FIGS. 1-2, the header (14) is positioned low enough to pick up the lowest buds (18) of the cannabis plants (16), but high enough to avoid having the header (14) contact the agricultural field (20), rocks (22) or other non-plant material in the agricultural field (20) that could cause damage to the header (14). If the cannabis plants (16) are bent, the header (14) may be lowered to gather the cannabis plants (16) into the combine (12). The combine (12) is preferably provided with a pickup reel (24) having horizontal bats (26) provided with tines (28) to grip the cannabis plants (16) as the pickup reel rotates in a manner such as that known in the art. As the combine (12) moves through rows (30) of cannabis plants (16) in the agricultural field (20), the tines (28) of the pickup reel (24) direct the cannabis plants

(16) toward a cutter bar (32) having teeth (34) sufficient to cut the stalks (36) of the cannabis plants (16).

Behind the cutter bar (32), a draper conveyor belt (38) directs the cannabis plants (16) to the center of the header (14) where the cannabis plants (16) are conveyed toward the thresher (40) by the feeder house (42), in a manner such as that known in the art. The feeder house (42) includes a plurality of metal ribs (44) connected to chains (46) that move the cannabis plants (16) into the thresher (40).

The cannabis plants (16) enter the thresher (40) where they are rubbed between a single or multiple rotary cylinders (48) and a material conveyor, such as a grate, such as a concave (50) positioned at least partially below the rotary cylinder (48). As the combine (12) turns the rotary cylinder (48) the cannabis plants (16) are rubbed against the concave (50) until the buds (52) and seeds (54) are stripped from cannabis plants (16). The concave (50) has openings that allow smaller material such as seeds (54) and chaff (55), such as buds (52), to pass through the concave (50) and fall onto a plurality of seed sieves (56) in a seed receiving area (58) below.

Figure 3:
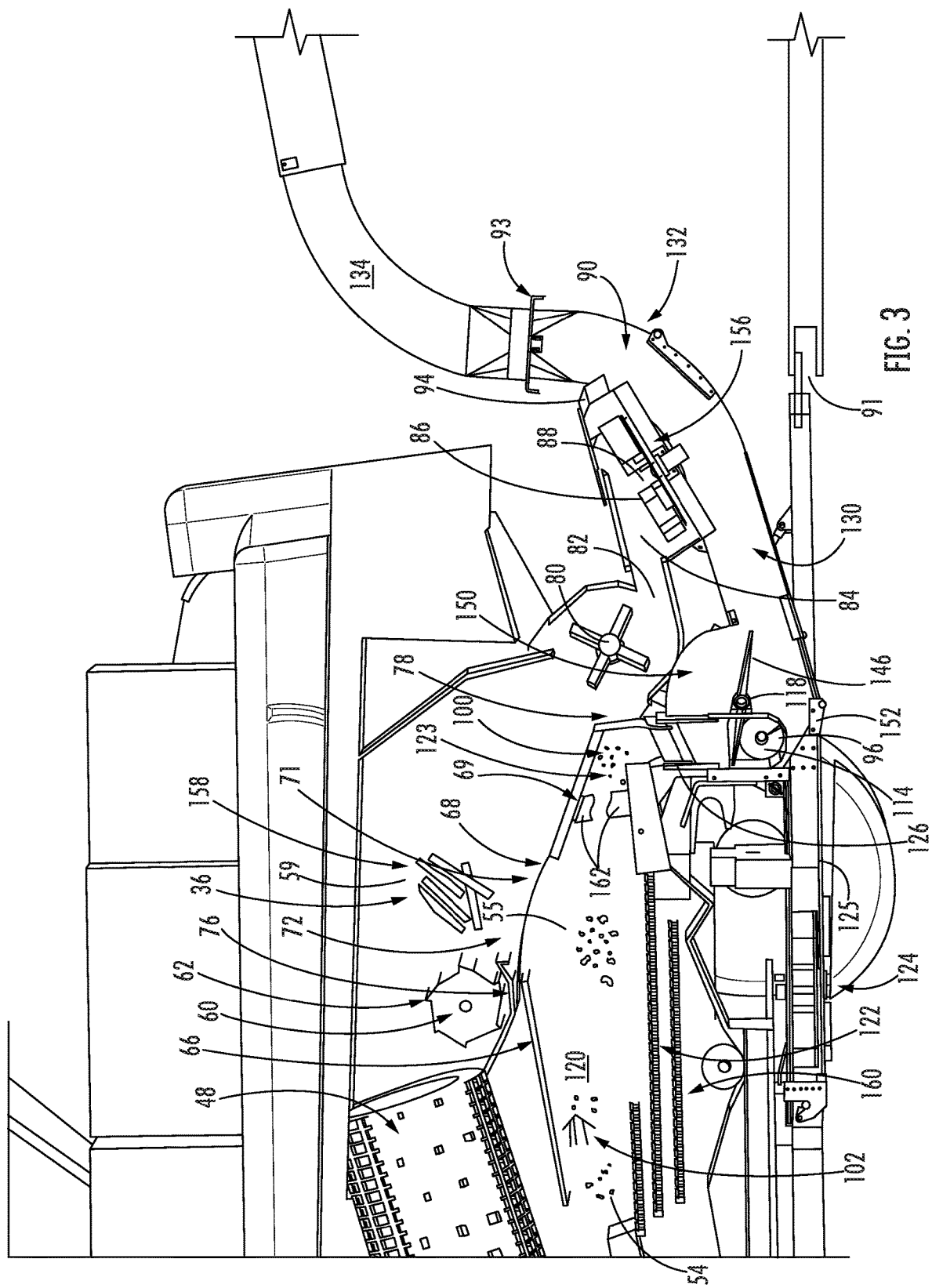
FIG. 3 illustrates a side elevation in cross section of the agricultural material separator of FIG. 1.
Figure 4:
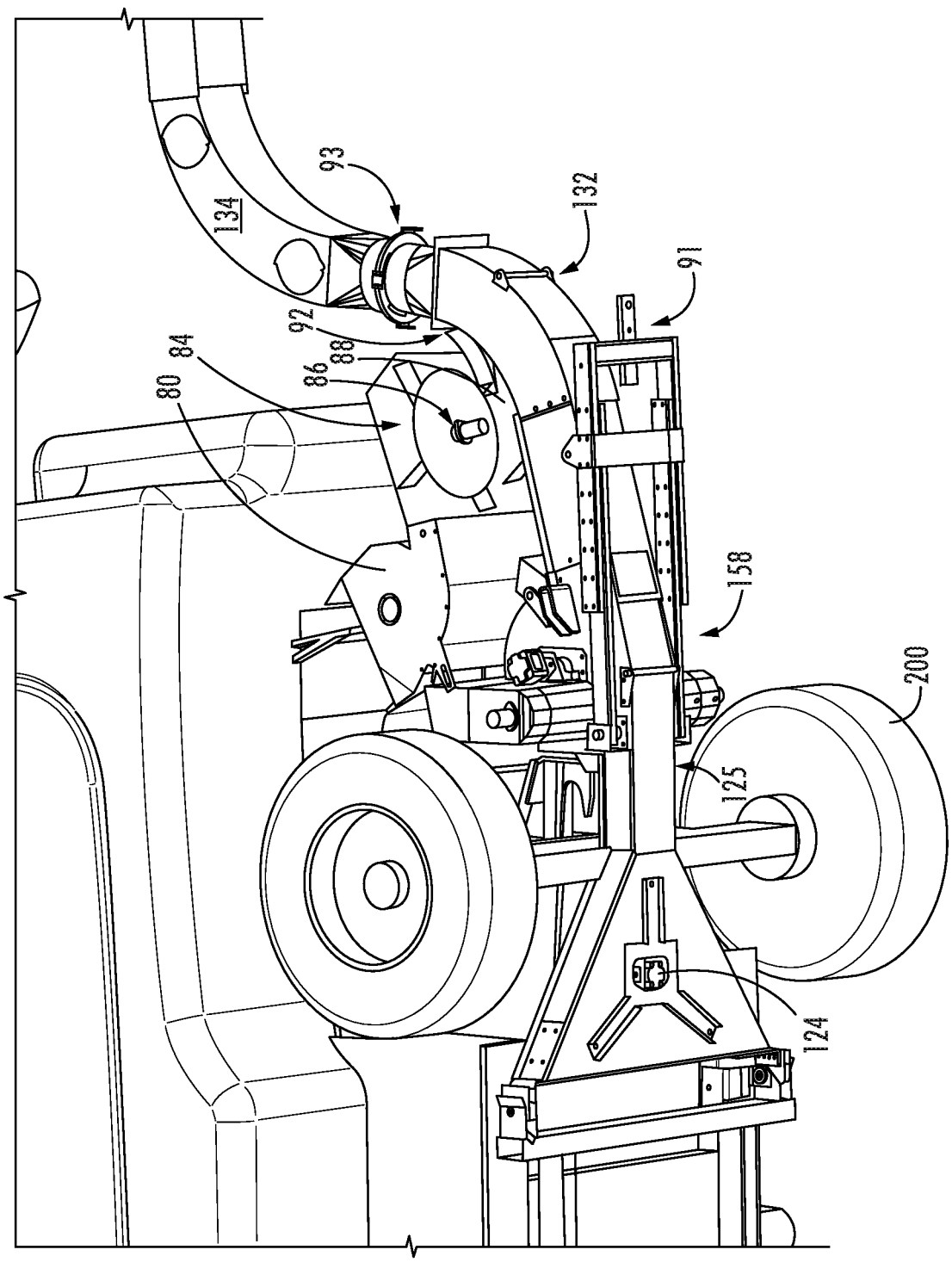
FIG. 4 illustrates a bottom perspective view of the agricultural material separator of FIG. 1.
Figure 5:
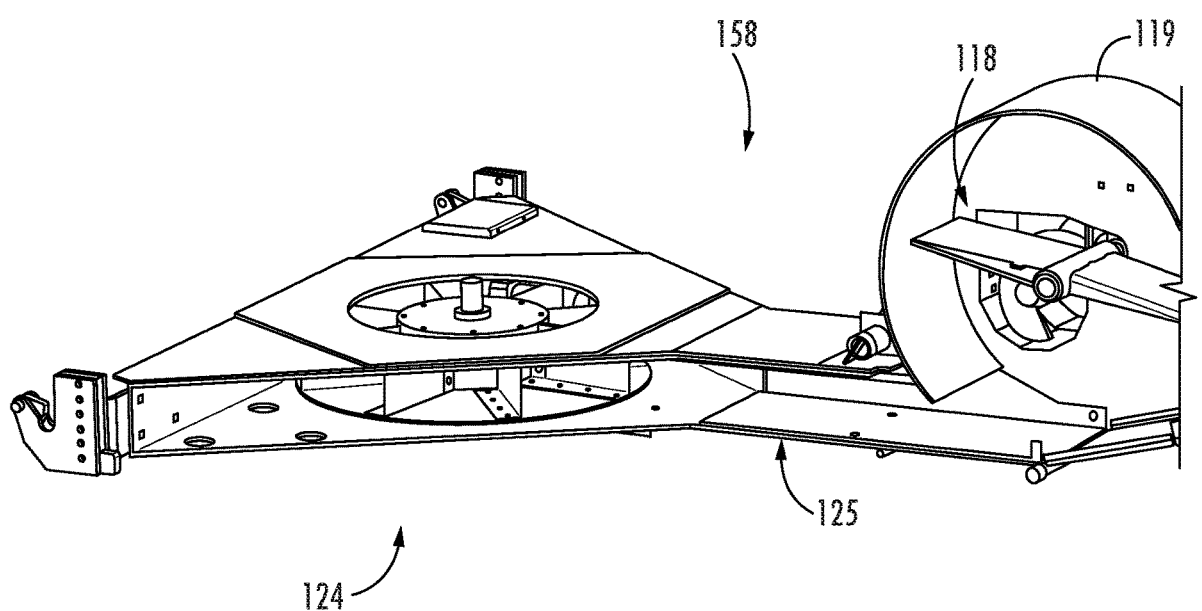
FIG. 5 illustrates a bottom perspective view of the agricultural material separator of FIG. 1.
Figure 6:
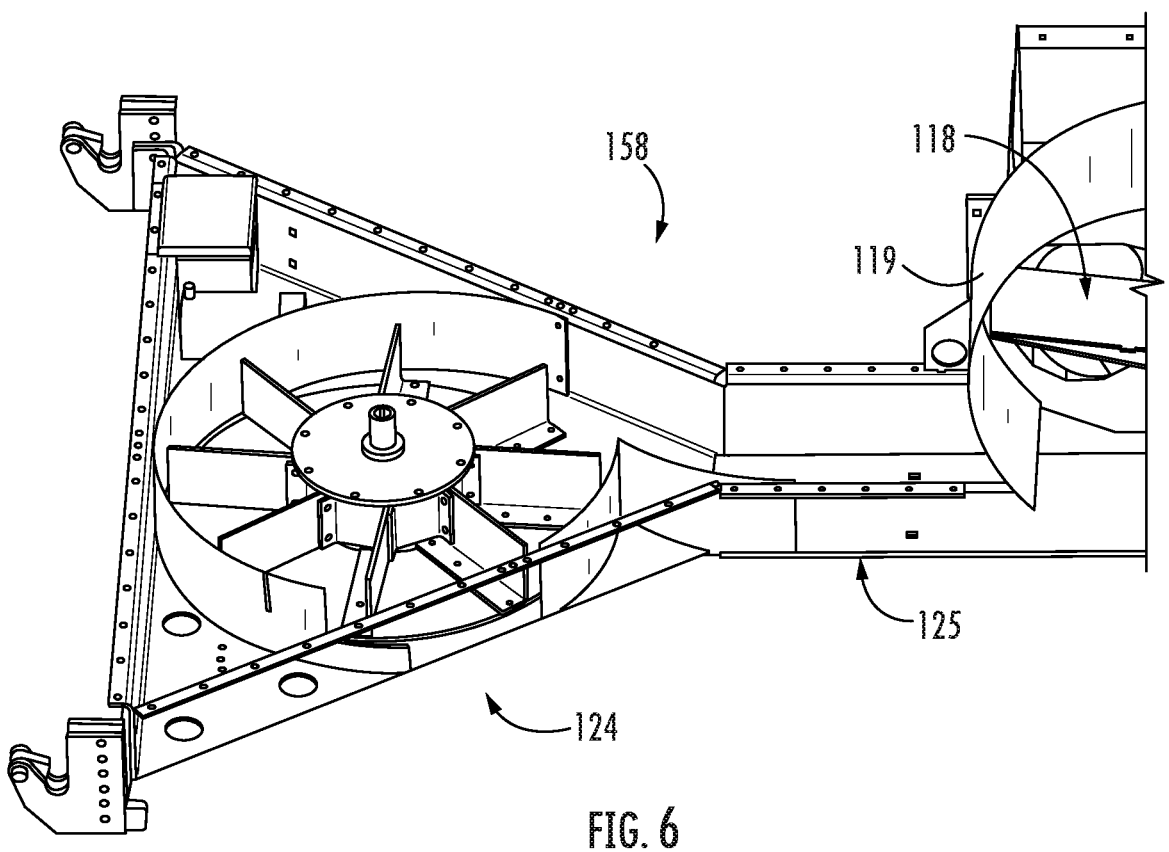
FIG. 6 illustrates a bottom perspective view of the agricultural material separator of FIG. 1.

The larger stems (59) and stalks (36) are too large to pass through the concave (50) and are driven by the rotary cylinder (48) rearward into a rotating discharge beater (60). Provided under the bottom of the discharge beater (60) is a concave beater grate (64) such as those known in the art. Provided under the beater grate (64) is a combine pan (66) angled to direct buds (52) and seeds (54) still passing through the concave (50) downward and forward into the seed receiving area (58). FIGS. 2-3.

From the rotary cylinder (48), the stems (59) and stalks (36) are transferred from the beater (60) to a processing assembly (158). While the processing assembly (158) may be integral with the combine (12), in one embodiment the processing assembly (158) is removable. This allows a standard combine (12) to be used as a standard combine and when it is desired to harvest a product with valuable chaff (55), such as cannabis; the processing assembly (158) may be releasably attached to the combine (12). To attach the processing assembly (158) to the combine (12), any portions of the combine protruding into the area receiving the processing assembly (158) are removed and any remaining ducts or openings (not shown) are sealed to prevent the exit of chaff (55) through such openings. The stover conveyor, such as a ceiling pan (68) is then secured to the existing cleaning shoe (160) of the combine (12) by a pair of steel supports (162). The steel supports (162) are secured to the ceiling pan (68) and cleaning shoe (160) with bolts or similar fasteners. Alternatively, if the modification is to be permanent, the steel supports (162) may be welded, or otherwise permanently coupled to the ceiling pan (68) and cleaning shoe (160).

Figure 10:
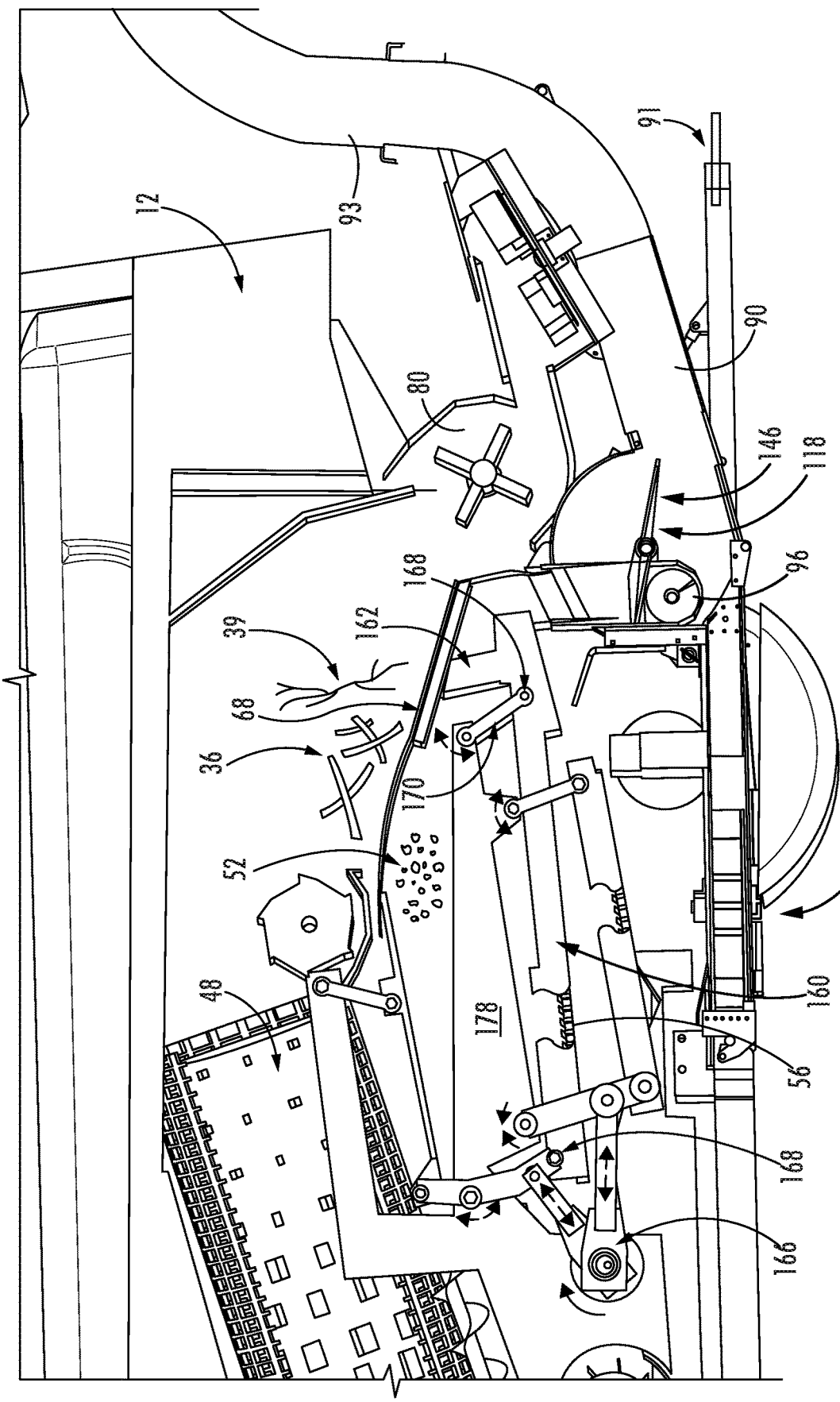
FIG. 10 illustrates a side elevation in partial cross section of the agricultural material separator of FIG. 1, shown with a cleaning shoe rigidly coupled to a ceiling pan.

The ceiling pan (68) is made of lightweight material, preferably having a steel frame (69) housing an interior plate (71) of high density polyethylene. The forward end (76) of the ceiling pan (66) is wedged between, but unsecured to, the beater grate (64) and the combine pan (66) to allow the ceiling pan (66) to move relative to the beater grate (64) and the combine pan (66), while substantially preventing buds (52) and other chaff (55) from escaping out of the seed receiving area past the ceiling pan (66). The rearward end (78) of the ceiling pan (66) is constructed of a highly resilient material such as rubber to allow the ceiling pan (66) to shake along with a sidewall (70) of a chaffer housing (72). Preferably, the ceiling pan (68) is rigidly, or at least semi-rigidly, coupled to the cleaning shoe (160) so movement transferred to the cleaning shoe (160) by a slave arm (164) of a motor and slider-crank linkage assembly, such as a rockshaft (166), is in turn transferred to the ceiling pan (68). As shown in FIG. 10, in a manner known in the art, the cleaning shoe (160) is coupled to the combine (12) with rubber bushings (168). The rubber bushings (168) support the cleaning shoe (160) while allowing the cleaning shoe (160) to reciprocate back and forth. Given the rigid connection of the ceiling pan (68) to the cleaning shoe (160) by the steel supports (162), reciprocal motion of the cleaning shoe (160) is transmitted to the ceiling pan (68), causing the ceiling pan (68) to motivate stems (59) and stalks (36) on top of the ceiling pan (68) rearward. This arrangement preferably reciprocates the ceiling pan (68) with a vertical stroke of between 1.5 and 4.5 centimeters, a horizontal stroke between 4.75 and 5.75 centimeters, and a frequency of between 280 and 320 oscillations per minute.

Figure 11:
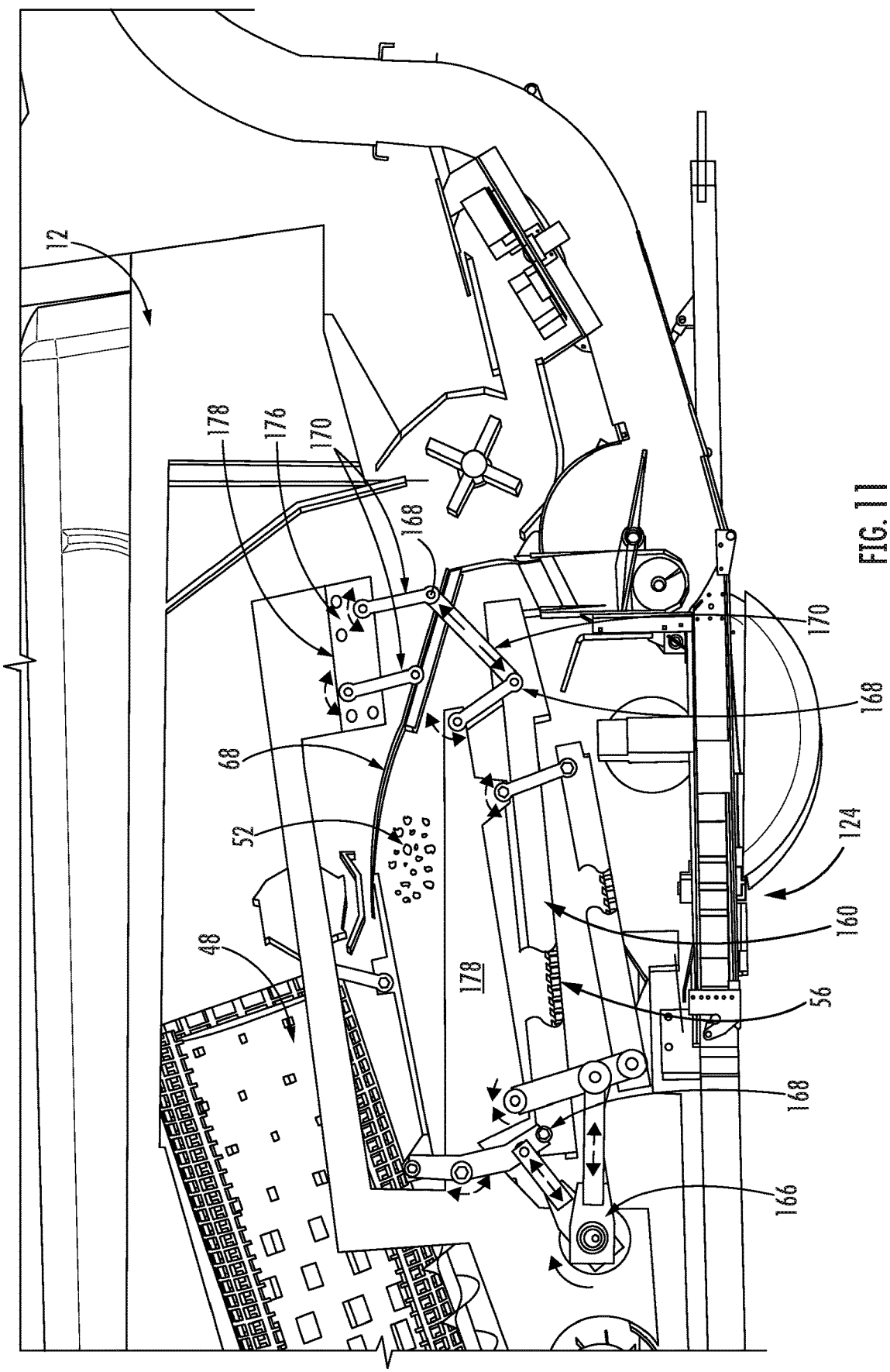
FIG. 11 illustrates a side elevation in partial cross section of an agricultural material separator according to another embodiment of the present invention, shown with a connector link pivotally coupled between a cleaning shoe and a ceiling pan.
Figure 12:
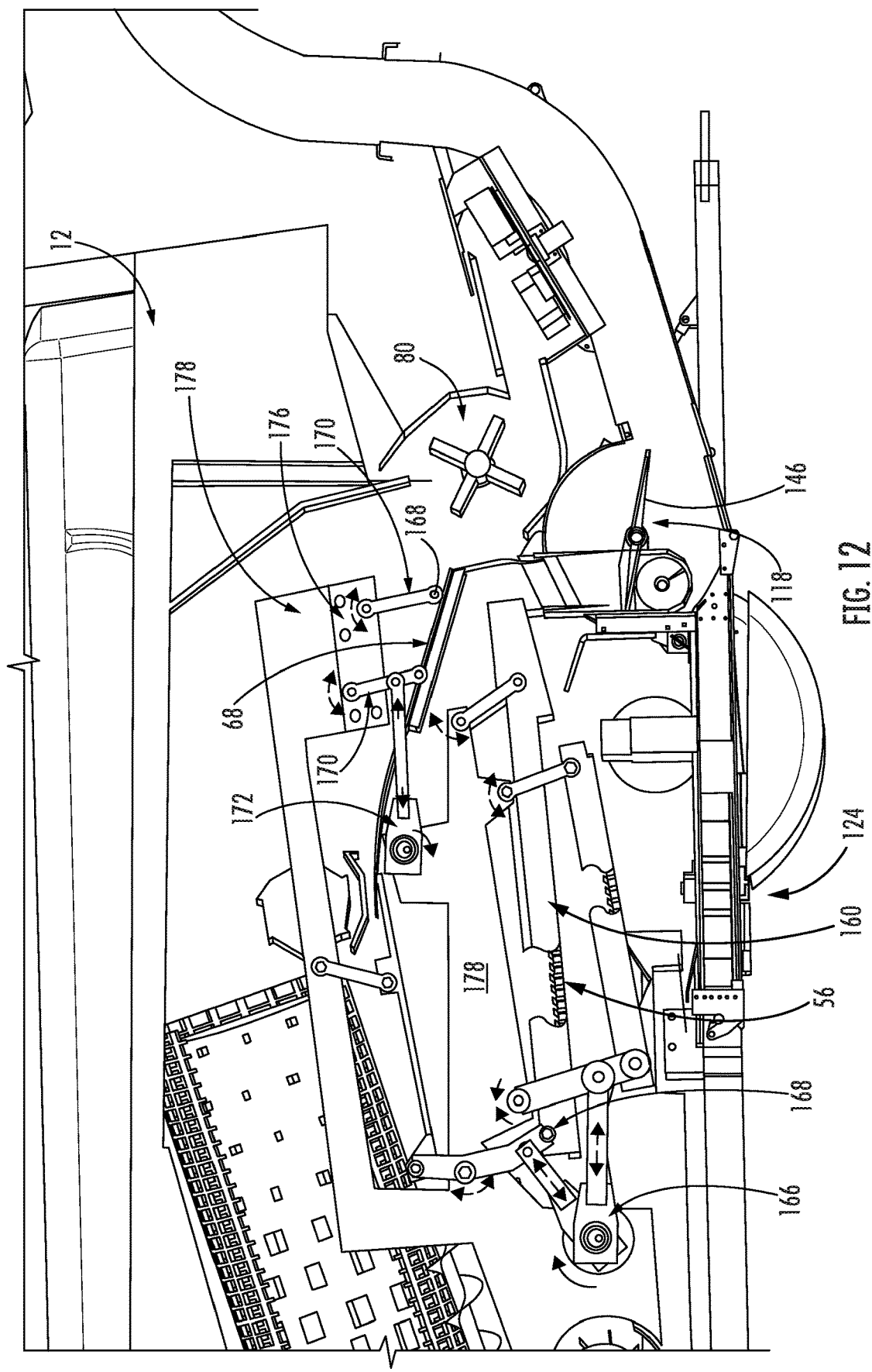
FIG. 12 illustrates a side elevation in partial cross section of an agricultural material separator according to an alternative embodiment of the present invention, shown with a hydraulically-driven rockshaft pivotally coupled above and to a ceiling pan.
Figure 13:
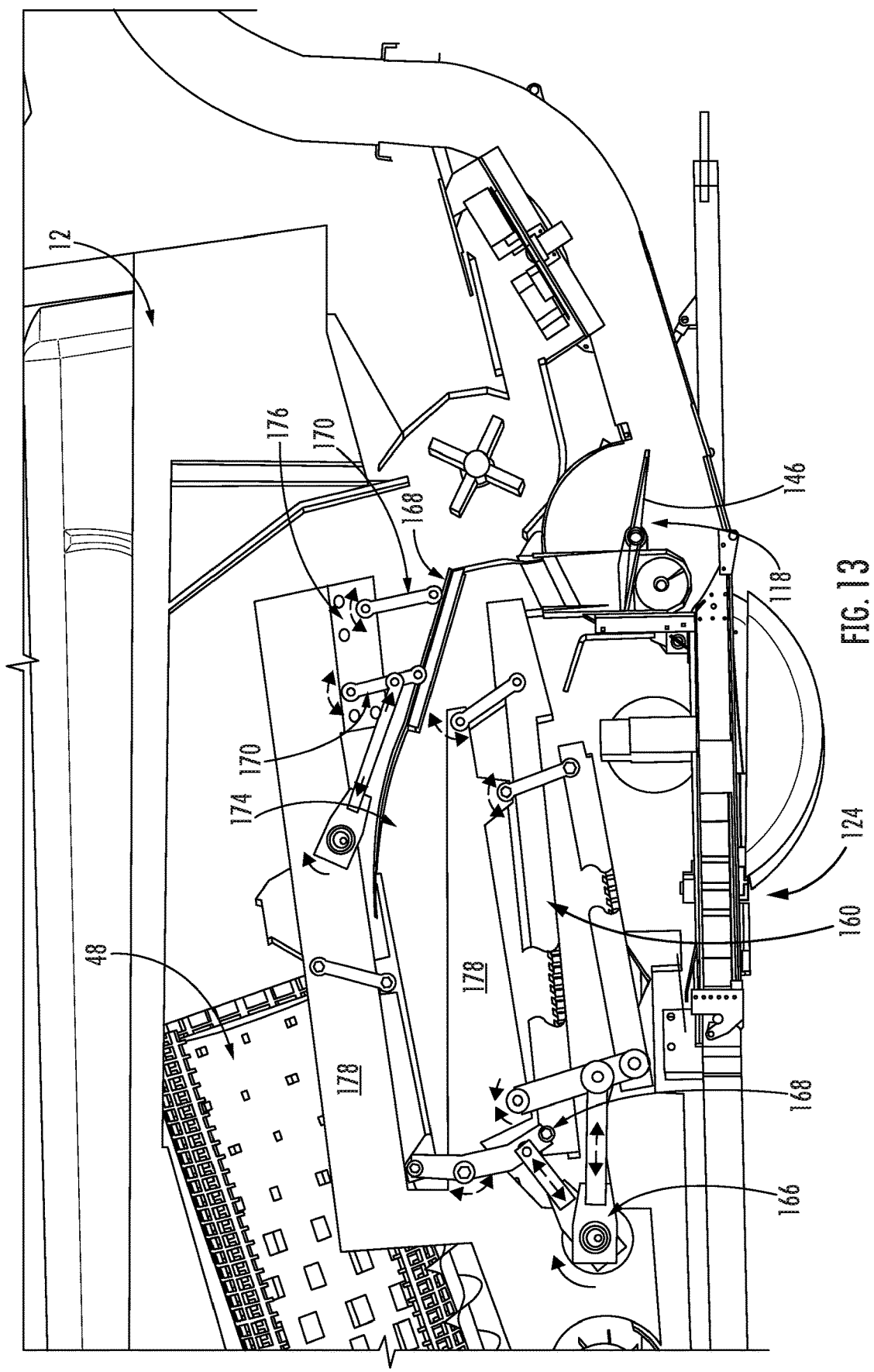
FIG. 13 illustrates a side elevation in partial cross section of an agricultural material separator according to an alternative embodiment of the present invention, shown with a hydraulically-driven rockshaft pivotally coupled below and to a ceiling pan.

In an alternative embodiment shown in FIG. 11, instead of using steel supports (162), the ceiling pan (68) may be coupled to the cleaning shoe (160) by a pair of rigid steel slave arms (170) pivotally coupled to both the ceiling pan (68) and the cleaning shoe (160). In another embodiment shown in FIG. 12, the steel supports (162) are eliminated and a supplemental rockshaft (172) is mounted to the combine (12) above the ceiling pan (68) and pivotally coupled to the ceiling pan (68). In another embodiment shown in FIG. 13, the steel supports (162) are eliminated and a supplemental rockshaft (174) is mounted to the combine (12) below the ceiling pan (68) and pivotally coupled to the ceiling pan (68).

Figure 14:
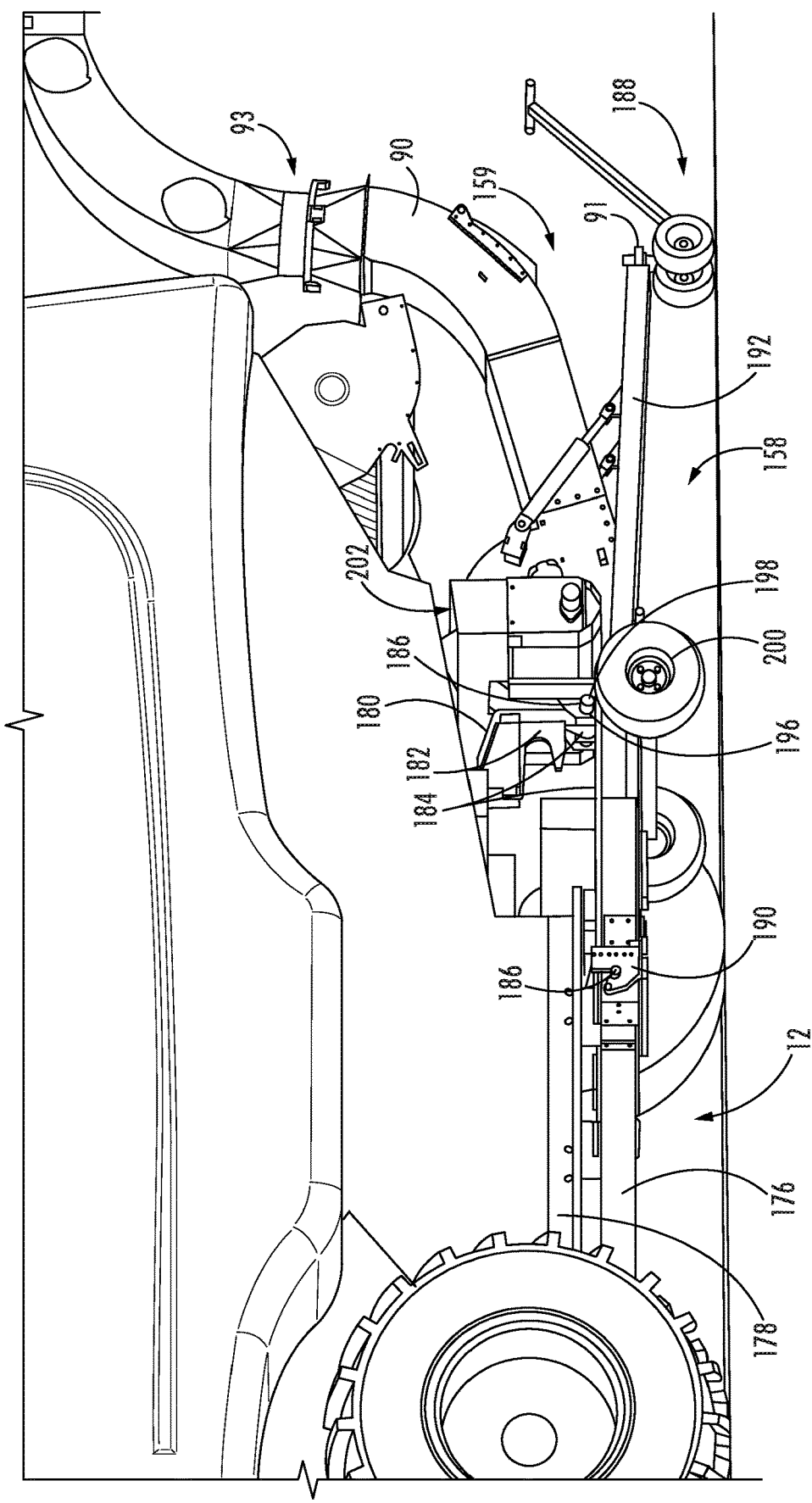
FIG. 14 illustrates a side perspective view in partial cutaway of the agricultural material separator of FIG. 7, shown with a dolly secured to a processing assembly of the agricultural material separator.
Figure 15:
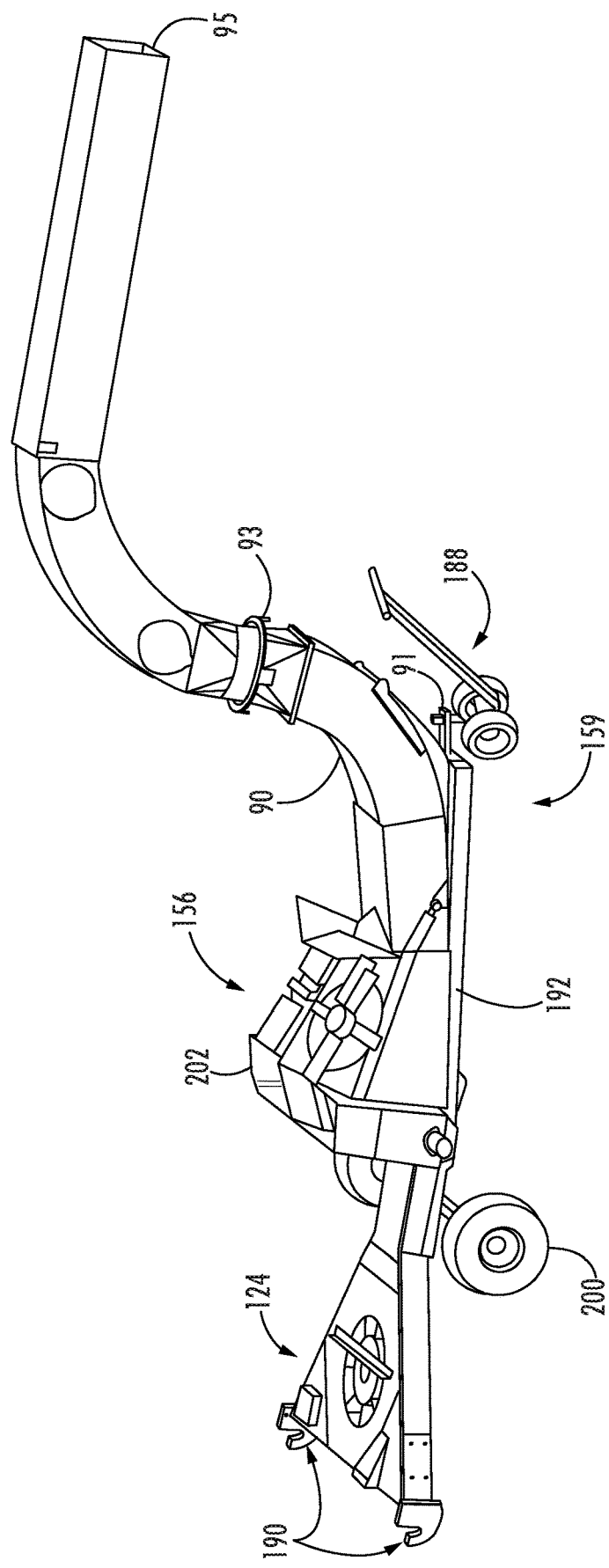
FIG. 15 illustrates a top perspective view of the processing assembly of FIG. 11 with a ceiling pan and cleaning shoe removed, shown on the dolly and removed from a combine.
Figure 16:
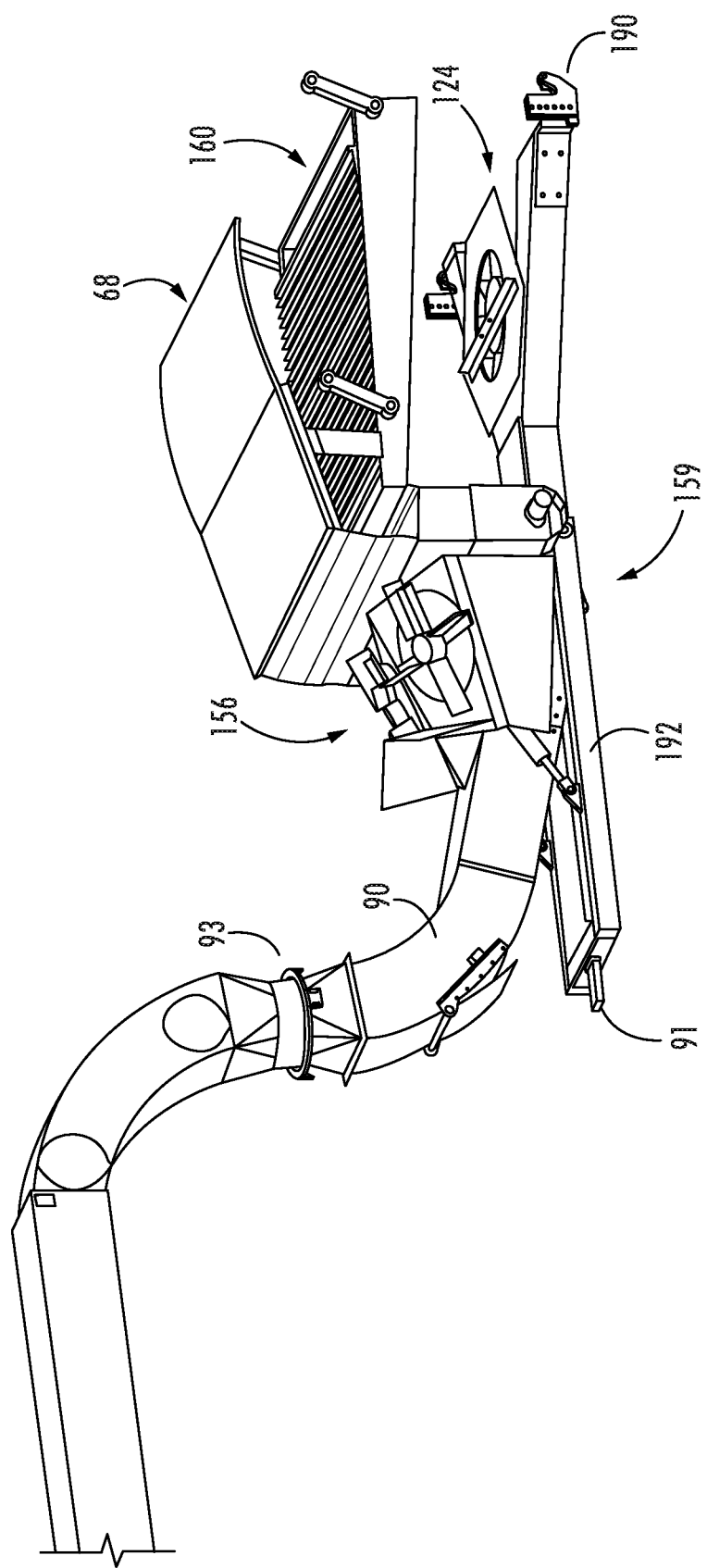
FIG. 16 illustrates a top perspective view of the processing assembly, ceiling pan, and cleaning shoe of FIG. 15.

In a preferred embodiment, as shown in FIG. 14, a steel frame (176) is secured to the frame (178) of the combine (12). The steel frame (176) need not be removable, and therefore may be welded or otherwise secured to the frame (178) of the combine (12). Additionally, a steel connection plate (180) is secured to a prior art tow hook (182) of the combine (12). The connection plate (180) need not be removable, and therefore may be welded or otherwise secured to the tow hook (182). The connection plate (180) is provided with a hole (184) or other type of pin receiver to receive a securement pin (186) in a manner described below.

Depending on the type of combine (12) being retrofit, various parts of the combine (12) may have to be removed from the combine (12) to make room for the processing assembly (158). Once the parts are removed and any resulting holes sealed to prevent undesired egress of chaff (55), the processing assembly (158) is positioned at the rear of the combine (12). To facilitate the mounting process, the processing assembly (158) may be coupled to a cart or dolly (188) and provided with ground engaging wheels (200) to form a mobile processing module (159) to aid in rapid retrofitting. As shown in FIGS. 14-17, forming the mobile processing module (159), are at least the wheels (200), the dolly (188), the centrifugal fan (124), the beater (118), and the air chute (90). Optionally, the ceiling pan (68) and the cleaning shoe (160) may form part of the mobile processing module (159) as well.

Figure 8:
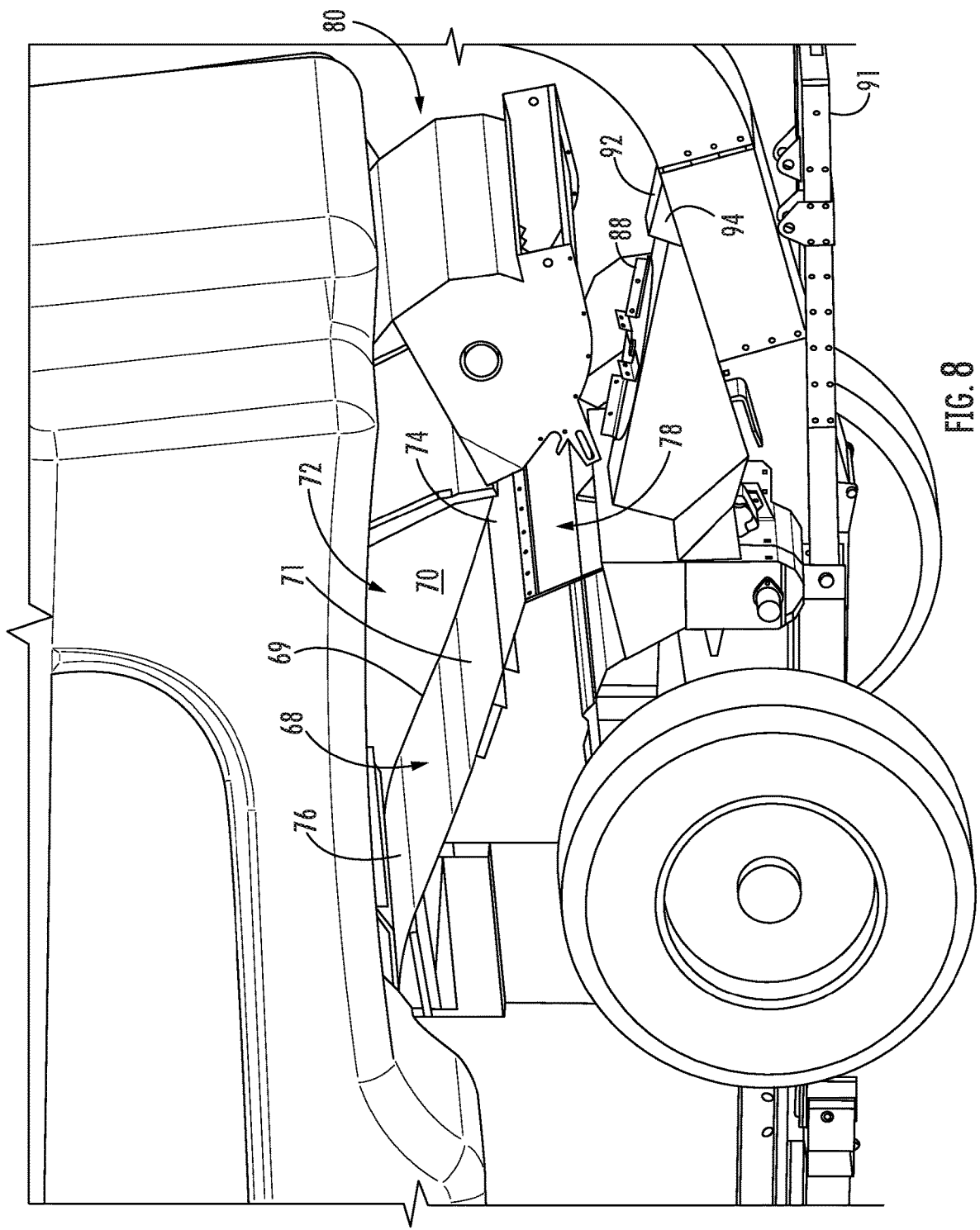
FIG. 8 illustrates a rear perspective view of the agricultural material separator of FIG. 7.

After the dolly (188) positioned to insert the processing assembly (158) into the rear of the combine (12), the dolly (188) is moved forward until latches (190) on a steel frame (192) of the processing assembly (158) are engaged, secured, and latched to pins (186) secured to the steel frame (176). Once the latches (190) are secure, the dolly (188) is used to pivot the rear of the processing assembly (158) upwards until securement holes (196) provided on the processing assembly (158) are aligned with the hole (184) in the connection plate (180). A securement pin (198) is provided through the holes (196) of the processing assembly (158) and the hole (184) of the connection plate (180) and secured therein. A rubber sealing mat (126) is provided on the processing assembly (158) to provide a substantially airtight seal of the processing assembly (158) against the combine (12). The rubber sealing mat (126) preferably presses into an existing rubber seal (not shown) already on the combine (12), but the rubber sealing mat (126) may be pressed into contact with a metal face, or any desired portion of the combine (12), and may be of any desired construction, of any desired material, to effectuate the desired seal. The wheels (200) of the processing assembly (158) are removed, and the bottom of the rubber rearward end (78) of the ceiling pan (68) is positioned into the chaff intake (202) of the processing assembly (158) to seal off the seed receiving area (58). FIGS. 3, 8, and 14.

Once in operation, after the buds (52) and seeds (54) are removed from the stalks (36), the rotary cylinder (48) drives the remaining stalks (36) into the discharge beater (60). FIG. 3. The discharge beater (60) discharges stems (36) onto or behind the ceiling pan (68).

Positioned rearward of the ceiling pan (66) is a chopper (80). As shown in FIGS. 1-6, the chopper (80) may be slid forward into a chopping position, positioned directly behind the ceiling pan (66). Most of the stalks (36) and stems (59) discharged from the rotary cylinder (48) are thrown by the discharge beater (60) directly to the chopper (80). However, some of the stalks (36) and stems land on the ceiling pan (66). As the ceiling pan (66) shakes along with the sidewall (70) of a chaffer housing (72), the ceiling pan (66) motivates stalks (36) and stems (59) on the ceiling pan (66) downward and rearward into the chopper (80). The chopper (80) then cuts and discharges the stalks (36) and stems (59) through a discharge outlet (82) onto a tailboard (84). The tailboard (84) has rotary spinners (86) and (88) that discharge the stalks (36) and stems past a duct, such as an air chute (90) onto the agricultural field (20). As detailed below, air chute (90) defines an interior (130) in fluid communication with a chaff suspension area (123). Preferably, the rotary spinners (86) and (88) are hydraulically driven in opposite directions to spread the stalks (36) and stems (59) back onto the agricultural field (20) for biodegradation. Crop flow vanes (92) and (94) are used to prevent buildup as the rotary spinners (86) and (88) discharge the stalks (36) and stems. FIGS. 3 and 8.

After the seeds (54) and buds (52) pass through the concave (50) into the seed receiving area (58) below, the seeds (54) and buds (52) are driven rearward by an auger (96) onto the plurality of seed sieves (56). A blower, such as a clean grain fan (98) is positioned below the seed sieves (56) to drive air (102) through the seed sieves (56) to blow chaff from the seeds (54). FIGS. 2-3. Because the ceiling pan (68) has substantially sealed the seed receiving area (58) off from fluid communication with the discharge outlet (82), the speed of the cleaning fan (98) can be increased without fear of losing the chaff (55) that includes the buds (18) and valuable trichomes (100).

The flow of air (102) from the clean grain fan (98) is preferably sufficient to cause separation of the buds (52), trichomes (100), and other chaff from the seeds (54). Having a higher density than the buds (52), trichomes (100), and other chaff (55), the seeds (54) fall through the seed sieves (56) and are conveyed by an auger (104) to a lower container (106), where the seeds (54) are then conveyed to a grain tank (108) in a manner known in the art. The seeds (54) may be stored in the grain tank (108) or off loaded into a forage wagon (not shown) or similar container via a conventional auger (110) provided inside an unloading pipe (112).

Air flow from the clean grain fan (98), along with oscillation of the seed sieves (56) move the buds (52), trichomes (100), and other chaff (55) upward toward the underside of the ceiling pan (68) which, in turn, redirects the airflow back downward toward a pair of chaff feed augers (114) and (116), provided on either side of an impeller, such as a beater (118). The beater (118) is preferably in the middle of the combine (12) so the chaff feed augers (114) and (116) can feed into each side of the beater (118) to increase feeding capacity. Locating the beater (118) in the center of the combine (12) also reduces weight balance issues as the beater (118) is installed and uninstalled from the combine (12). The flow of air (102) is supplemented by a supplemental blower, such as a large radial centrifugal fan (124) that is preferably located near the forward end of the processing assembly (158). The centrifugal fan (124) intakes air from above the centrifugal fan (124) and forces the air through a duct (125). The duct (125) is preferably coupled into fluid communication with the an interior defined by a housing (119) surrounding the beater (118), but may be coupled into fluid communication with the area forward or rearward of the beater housing (119). For example, the duct may be coupled into fluid engagement with the air chute (90) at a location rearward of the beater (118). The centrifugal fan (124) is positioned to aid the beater (118) in propelling material through the air chute (90) and into a container (138). FIGS. 1, 3, and 5-6.

The seed sieves (56) move in a manner known in the art to agitate the seeds (54) away from the chaff and to "walk" the seed and chaff mixture (120) rearward to deposit the mixture on a conventional chaffer (122). The movement of the chaffer (122) and the air (102) from the clean grain fan (98) further separate the seeds (54) from the chaff and move the chaff off of the chaffer (122) into a chaff suspension area (123), and into the chaff feed augers (114) and (116). In the preferred embodiment, the clean grain fan (98) blows air rearward across the chaffer (122), as the beater (118) also draws air rearward across the chaffer (122). This generates an area of low air pressure to keep the crop particles suspended, thereby reducing the tendency of crop residue to stick to any interior walls. The centrifugal fan (124) forces air through the air chute (90) further reducing the tendency of the crop particles from resting against the interior walls of the air chute (90).

In another embodiment, the chaff feed augers (114) and (116) may be eliminated, so the clean grain fan (98) alone pushes the chaff (55) into the beater (118). However, for most crops it is desired to use the mechanical chaff feed augers (114) and (116), rather than relying on just airflow to transport the chaff (55) to the beater (118). Using the chaff feed augers (114) and (116) there is less chance of plugging as some crops, such as cannabis, have a high oil content that can cause a residual buildup and eventual clogging. Heavier chaff (55) also is easier to convey mechanically than to rely of air velocity feeding. The chaff feed augers (114) and (116) are preferably twenty-three centimeters in diameter and feed the chaff (55) into a U-shaped opening (128) feeding into the beater (118) to prevent the chaff (55) from plugging. The beater (118) is driven counterclockwise by a hydraulic motor (not shown) to accelerate the chaff (55) into an airflow provided by the centrifugal fan (124). The centrifugal fan (124) provides additional air pressure and volume to accelerate the chaff (55) through the interior (130) of the air chute (90). The additional air pressure provided by the centrifugal fan (124) assists in the mechanical motion of the beater (118) to convey the chaff (55) through the air chute (90) without losing significant momentum in the tighter radius turns (132)

in the air chute (90). An additional advantage of the increased airflow is that the air blankets the chaff (55), reducing the tendency of the chaff (55) to stick to the interior sides (134) of the air chute (90).

The air chute (90) extends rearward at a slight elevation. The air chute (90) then angles upward toward vertical at a point directly above a drawbar (91) where a wagon (not shown) may be attached to the back of the combine (12). In the vertical section of the air chute (90) a pivot section (93) is provided to allow the outlet (95) of the air chute (90) to turn and always face the wagon. Above the pivot section (93), the air chute (90) angles back toward vertical to fill an agricultural material container (138), such as a wagon or an agricultural material bin, such as those known in the art, provided on top of the combine (12). The final horizontal section of the air chute (90) is preferably telescopic to allow one end of the air chute (90) to be affixed to the container (138) while the other end is attached to the combine (12).

The beater (118) is coupled into fluid communication with the interior (136) of the air chute (90) that feeds into a chaff collection area, such as the container (138) for the collection and storage of the chaff (55). The container (138) is provided with an air outlet (140) covered with a fine mesh screen (142) to allow air to escape, while preventing the escape of chaff. The mesh screen (142) is preferably provided with perforations configured to retain particles of a size 500 microns and larger, more preferably 100 microns and larger, and most preferably 40 microns and larger. While the container (138) may be of any suitable construction, configuration, or connection desired, in the preferred embodiment the container (138) is a modified forage wagon positioned to allow an operator (143) to monitor the container (138) during operation of the combine.

While the beater (118) may be rotated at any desired speed, in the preferred embodiment, the beater (118) is driven at a speed of between five hundred to twenty-five hundred revolutions per minute, and more preferably one thousand to two thousand revolutions per minute. In the preferred embodiment, the beater (118) is driven at a speed of approximately eight hundred revolutions per minute by a hydraulic system (144) associated with the combine (12). The speed may vary according to the size of the beater (118) and the agricultural material being collected.

It should be noted that the beater (118) may be of any desired configuration and be provided with any number of blades (146), including a single blade, or more preferably two blades (146), in any desired configuration or orientation. The centrifugal fan (124) blows air into the air chute (90) in a manner that generates a venturi effect, at the point where the seed and chaff mixture (120) is about to contact the beater (118), to facilitate propulsion of the seed and chaff mixture (120) toward the beater (118) before the blades (146) of beater (118) strike the seed and chaff mixture (120) and propel it upward into the air chute (90).

When it is desired to modify the combine (12) to collect chaff (55), the dolly (188) is used to secure the processing assembly (158) to the combine (12) in a manner such as that described above. The container (138) is then secured to the top of the combine (12) and hydraulic connections are coupled to the hydraulic system (144) to drive the centrifugal fan (124), chaff feed augers (114) and (116), and beater (118), all of which may be manually adjusted or wirelessly adjusted from a cab (154) of the combine via wireless or wired connection to change the speed of various components to adjust for changing conditions.

Running the spinners (86) and (88) slowly outputs the stems and stalks (36) onto the ground in windrows, making it easier to return and collect the stems (59) and stalks (36) later. Running the spinners (86) and (88) faster spreads the stems (59) and stalks (36) onto the agricultural field (20) more evenly.

Figure 7:
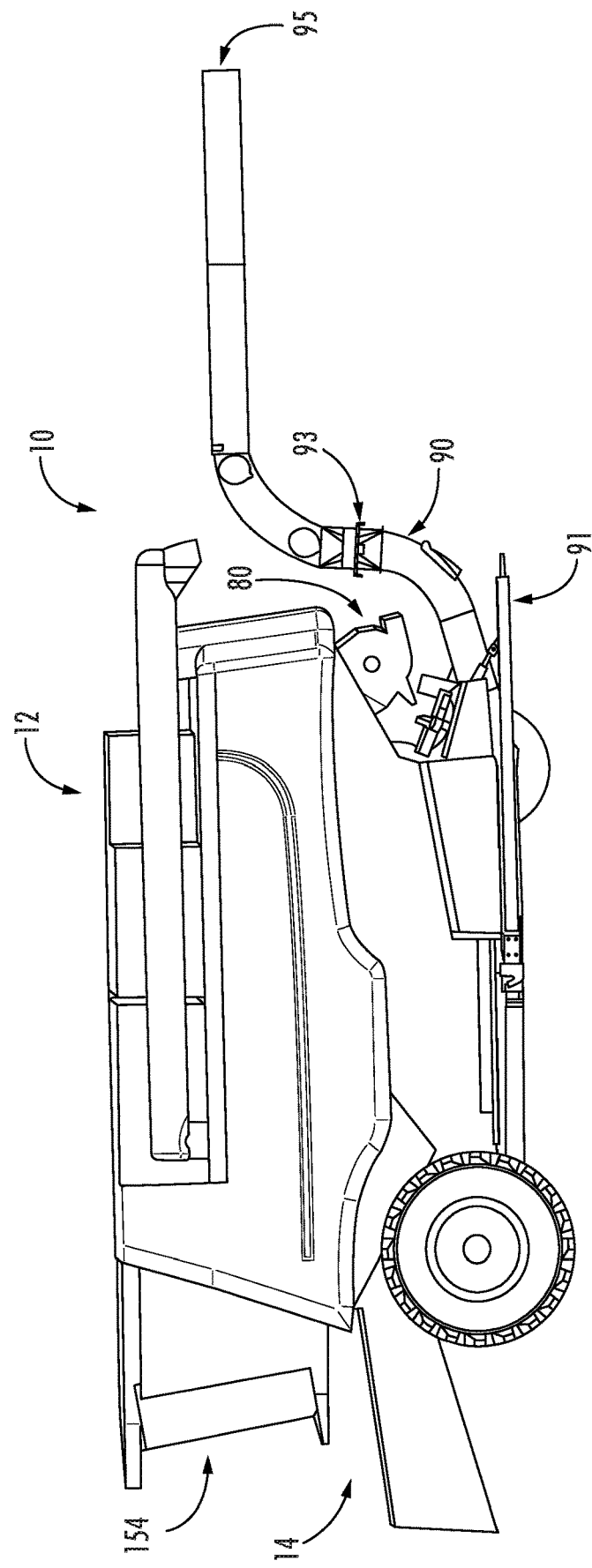
FIG. 7 illustrates a side elevation of an agricultural material separator according to another embodiment of the present invention shown with the chopper moved upward and rearward and the spreaders moved forward of the chopper.
Figure 9:
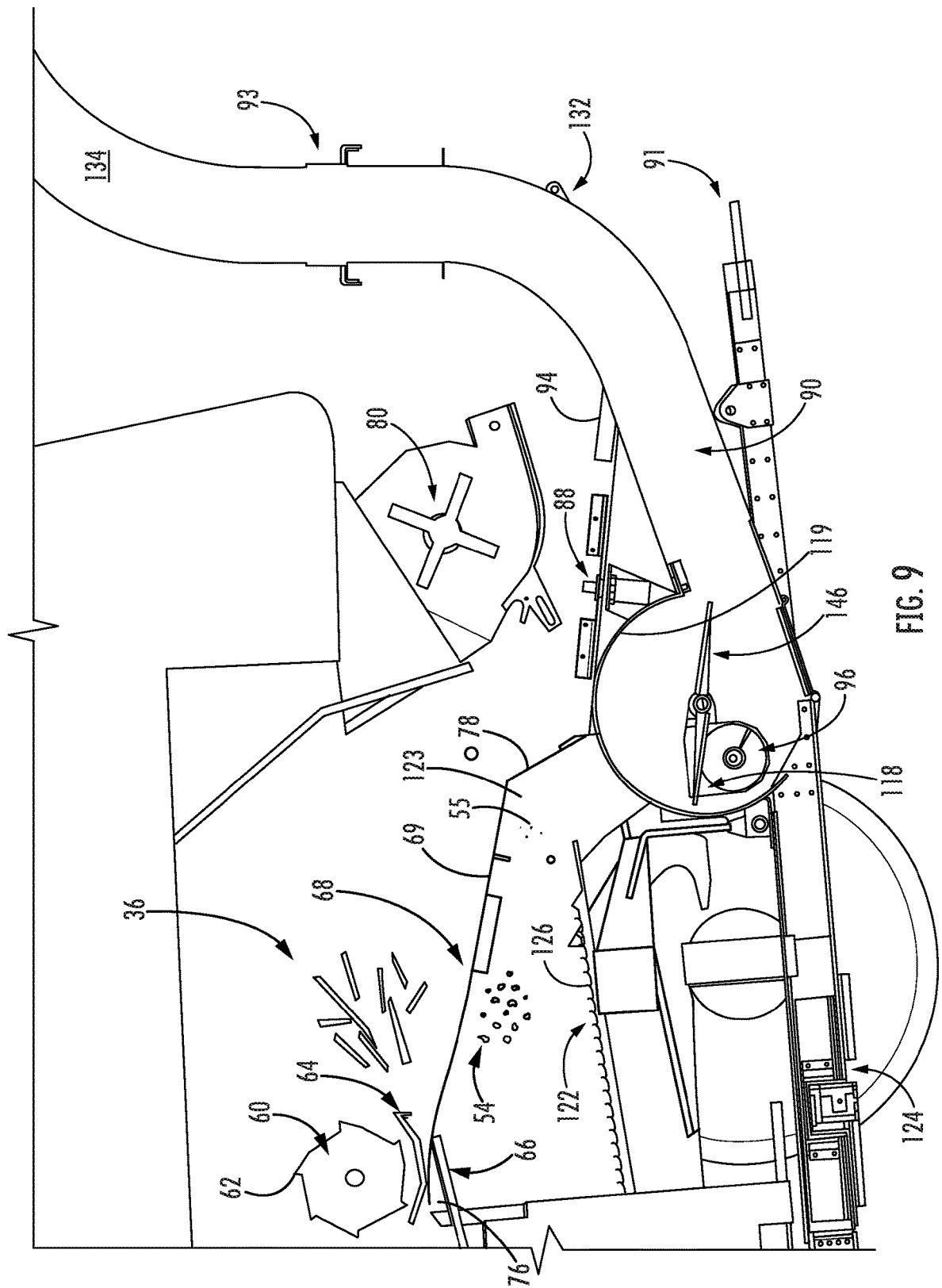
FIG. 9 illustrates a side elevation in cross section of the agricultural material separator of FIG. 7.

According to an alternative orientation of the cleaning system (10) the chopper (90) is moved rearward to allow for room for material to be discharged to the ground without getting chopped by the chopper (90). FIGS. 7-9. The discharge beater (60) throws stems (59) and stalks (36) rearward to a rotary spreader system (156). The ceiling pan (68) reciprocates; also moving stems (59) and stalks (36) rearward to a rotary spreader (156). The rotary spreader (156) is used to prevent buildup and clogging of the stems (59) and stalks (36) and return the stems (59) and stalks (36) to the agricultural field (20) without buildup on the air chute (90) and drawbar (91) as in a preferred embodiment the air chute (132) and drawbar (91) are centrally located relative to the rest of the combine (12).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. For example, the centrifugal fan (124), chaff feed augers (114) and (116), and beater (118) may be driven by any power source at any desired speed. Additionally, the centrifugal fan (124), chaff feed augers (114) and (116), and beater (118), may be of any desired diameter or configuration.

What is claimed is:

1. An agricultural material collection system comprising:
   (a) an agricultural vehicle;
   (b) an agricultural material collector;
   (c) a seed sieve;
   (d) a thresher positioned above the seed sieve;
   (e) a seed receiving area positioned at least partially below, the seed sieve;
   (f) a blower in fluid communication with the seed receiving area;
   (g) a chaff collection area in fluid communication with the seed receiving area;
   (h) a seed collection area in fluid communication with the seed receiving area;
   (i) a duct defining an interior in fluid communication with the chaff collection area;
   (j) an impeller provided in fluid communication with the duct;
   (k) wherein the duct is positioned between the seed receiving tea and the chaff collection area; and
   (l) a cleaning shoe coupled to the agricultural vehicle;
   (m) a ceiling pan located to receive material exiting the thresher, wherein the ceiling pan is coupled to the cleaning shoe in a manner wherein movement of the cleaning shoe relative to the agricultural vehicle is transferred to the ceiling pan.

2. The agricultural material collection system of claim 1, further comprising a supplemental blower in fluid communication with the duct.

3. The agricultural material collection system of claim 2, wherein the impeller is positioned to contact agricultural material during operation of the agricultural material collection system and wherein the supplemental blower is positioned so as not to contact agricultural material contacting the impeller.

4. The agricultural material collection system of claim 2, further comprising a mobile processing assembly releasably coupled to the agricultural vehicle to form the agricultural material collection system, wherein the processing assembly comprises ground-engaging wheels and the supplemental blower, and wherein the processing assembly does not comprise the blower.

5. The agricultural material collection system of claim 4, wherein the mobile processing assembly further comprises the impeller and the duct.

6. The agricultural material collection system of claim 1, wherein the impeller comprises:
   (i) an axle;
   (ii) a first paddle coupled to the axle and extending at least partially across a first axial point along the axle; and
   (iii) a second paddle coupled to the axle and extending at least partially across the first axial point along the axle.

7. The agricultural material collection system of claim 1, wherein the impeller is rotating at a speed of at least two hundred and fifty revolutions per minute.

8. The agricultural material collection system of claim 1, father comprising:
   (a) a chaff suspension area in fluid communication with the seed collection area and the chaff collection area; and
   (b) a stover conveyor forming at least a portion of a wall of the chaff suspension area.

9. The agricultural material collection system of claim 1, wherein the chaff collection area is a trichomes collection area.

10. The agricultural material collection system of claim 1, wherein the ceiling pan is coupled to the cleaning shoe in a manner wherein reciprocal movement of the cleaning shoe relative to the agricultural vehicle is sufficiently transferred to the ceiling pan to motivate material on the ceiling pan rearward relative to the agricultural vehicle.

11. The agricultural material collection system of claim 1, wherein the ceiling pan is coupled to the cleaning shoe in a manner wherein reciprocal movement of the cleaning shoe relative to the agricultural vehicle is sufficiently transferred to the ceiling pan to motivate material on the ceiling pan rearward relative to the agricultural vehicle.

12. The agricultural material collection system of claim 1, wherein a forward portion of the ceiling pan is resilient and a rearward potion of the ceiling pan is rigid compared to the forward portion.

13. The agricultural material collection system of claim 1, wherein the ceiling pan is located and configured to seal the chaff collection area to substantially prevent the passage of the chaff out of the chaff collection area past the ceiling pan.

* * * * *

UNITED STATES PATENT AND TRADEMARK OFFICE
CERTIFICATE OF CORRECTION

| | |
|---|---|
| PATENT NO. | : 11,751,509 B2 |
| APPLICATION NO. | : 16/924837 |
| DATED | : September 12, 2023 |
| INVENTOR(S) | : Ty E. Stukenholtz and Jay E. Stukenholtz |

It is certified that error appears in the above-identified patent and that said Letters Patent is hereby corrected as shown below:

In the Claims

Column 10, Line 55:
In Claim 1, following "receiving" and before "and", please delete "tea" and insert therefor --area--.

Column 11, Line 24:
In Claim 8, following "claim 1" and before "comprising", please delete "father" and insert therefor --further--.

Signed and Sealed this
Seventeenth Day of October, 2023

Katherine Kelly Vidal
*Director of the United States Patent and Trademark Office*